United States Patent [19]

Tovi

[11] Patent Number: 4,934,792
[45] Date of Patent: Jun. 19, 1990

[54] LAMINATED BEAM SPLITTING OPTICAL SYSTEM WITH REFLECTIVE MEDIUM

[75] Inventor: Murray Tovi, Colorado Springs, Colo.

[73] Assignee: Theoretical Optics, Inc., Colorado Springs, Colo.

[21] Appl. No.: 362,691

[22] Filed: Jun. 7, 1989

[51] Int. Cl.$^5$ .................... G02C 7/10; G02B 27/00
[52] U.S. Cl. ................... 350/320; 350/276 R; 351/165; 351/44
[58] Field of Search .............. 351/165, 44, 45; 350/132, 276 R, 320, 452, 417

[56] References Cited

U.S. PATENT DOCUMENTS

| | | | |
|---|---|---|---|
| 2,675,740 | 4/1954 | Barkley | 350/276 R |
| 4,145,125 | 3/1979 | Chika | 351/165 |
| 4,609,266 | 9/1986 | Blom | 350/320 |
| 4,715,702 | 12/1987 | Dillon | 351/165 |

*Primary Examiner*—Bruce Y. Arnold
*Assistant Examiner*—James Phan
*Attorney, Agent, or Firm*—Richard W. Hanes

[57] ABSTRACT

A method of restoring the coherent light transmitting property of a first plate-like transparent medium which has a specific index of refraction and whose surface irregularities produce light scattering image distortion, which comprises the steps of applying a clear hardenable plastic to the said irregular surface, where such plastic has an index of refraction substantially similar to the index of refraction of the transparent medium and then applying one surface of a second separate part of the transparent medium directly to the plastic in adhering relationship thereto, where one of the opposing surfaces of the transparent medium is smooth and becomes the outside surface of a laminate formed by the first transparent medium, the plastic and the second part of the transparent medium. In structural form, an optical system comprising laminated light transmitting plate elements including a first layer having a smooth exterior surface and an opposing inner surface sculptured with forms and figure topographically contouring the inner surface of that layer in a three-dimensional relief, a light reflective film carried by the sculptured inner surface and a second light transmitting layer secured to the inner surface of the first lens layer. The optical system as described transmits coherent light through the entire body of the system and reflects light from the contoured coating to create an image of the bas relief object to an observer. Certain light scattering images reflectively coated eliminate secondary light reflections within the lens itself over the area coincident with the coating.

12 Claims, 1 Drawing Sheet

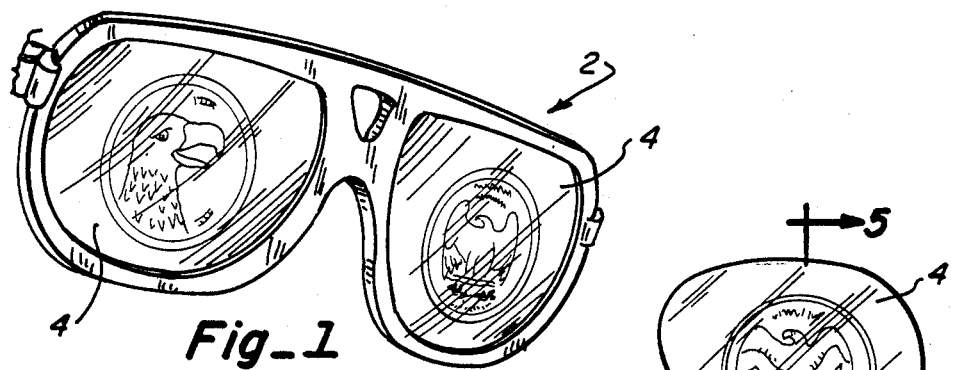
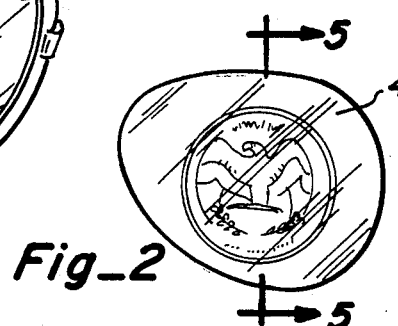
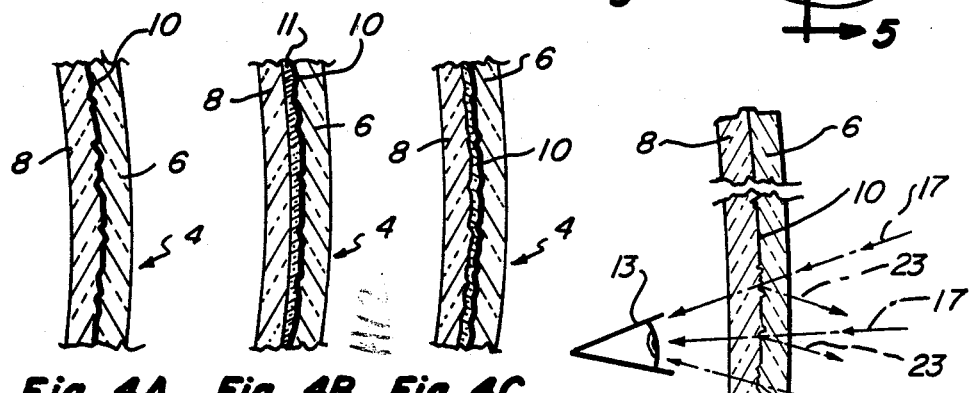
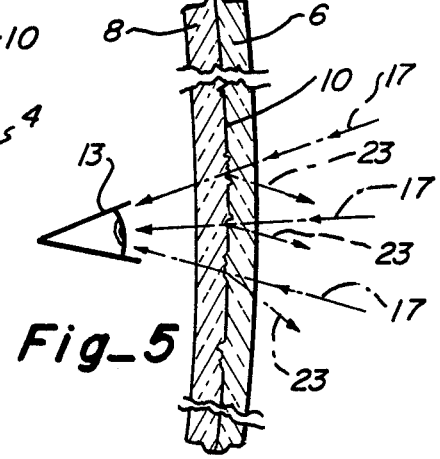
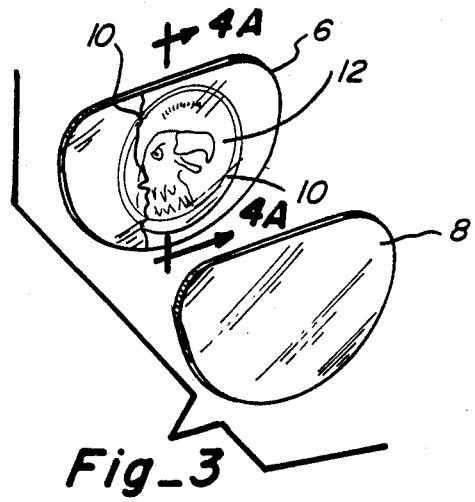
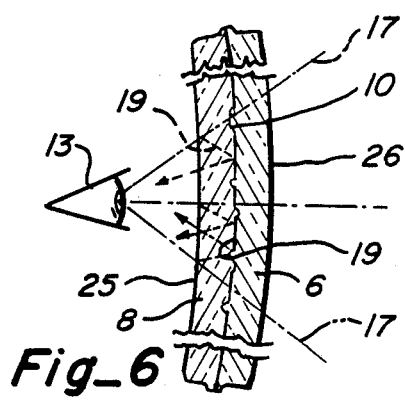

LAMINATED BEAM SPLITTING OPTICAL SYSTEM WITH REFLECTIVE MEDIUM

BACKGROUND OF THE INVENTION

The present invention relates primarily to optical systems and the method of making the same where laminated light transmitting plates are made capable of reflecting from one side of the laminate a three-dimensional image fixed in one of the plates while transmitting coherent light waves through the entire body of the laminate.

An eyeglasses lens with somewhat similar results, but in only two dimensions, is the subject of prior Letters Patent, but the present invention offers not only the reflective image with three-dimensional and bas relief depth but accomplishes the result with greater simplicity and effectiveness than the prior art.

The most pertinent prior art on the subject appears to be U.S. Pat. No. 4,715,702 disclosing a structure for providing a decorative pattern over the surface of sunglasses. The structure combines a positive, two-dimensional, decorative pattern imprinted on a first lens layer, a reflective layer, and a third layer incorporating a negative decorative pattern. The decorative pattern is apparent to an observer as a flat image, but the negative pattern cancels the image for the wearer who then sees only a uniform color or hue that does not interfere with his vision or cause a distraction.

Other patents which disclose eyeglasses where characters or symbols are applied to the lens surfaces are U.S. Pat. Nos. 4,329,378; 4,145,125 and 2,281,101. The disclosures of these patents are not considered pertinent to the present invention except for a vague similarity of purpose.

Laminated and coated lenses for preventing glare, such as found in U.S. Pat. Nos. 2,675,740; 2,230,009 and 4,320,939 share some of the structural aspects of this present invention but do not teach its methods or the same details of structure.

It is therefore the primary object of this present invention to provide an optical system that transmits coherent undistorted light images while at the same time producing a three-dimensional image to an observer by means of the light reflected from an interior contoured surface of one of the layers of the system assembly.

A second object of the invention is more universal, actually leading to the first objective. That objective is to provide a method whereby a scratched or otherwise surface-distorted light transmitting plate may be reconstituted, without surface reclamation or alteration, to pass coherent light waves without the scattering effect produced by the surface distortion.

A further objective of the invention is to provide a novel lens assembly that substantially eliminates secondary light reflection within the lens without the use of outside surface anti-reflective coatings, at least over the portion of the lens having a light scattering surface formed into the interior of the lens system for image reflection purposes.

A further object of the present invention is to provide a lens structure of the type described which lends itself to construction from plastic components which can be dipped to create gradation tinting, especially for use when the lens is applied to sunglasses.

Other and further objects, features and advantages of the invention will become apparent upon a reading of the detailed description of a preferred form of the invention which follows. It will also become apparent that the optical system of the present invention, while useful with lenses, can be employed in a large number of different applications which are not lens related, including windows, semi-transparent mirrors, closed circuit television discrete enclosures, furniture tops and displays.

The detailed description of the invention is directed toward applying the invention to sunglasses.

SUMMARY OF THE INVENTION

The practical aspects of the invention, as will be explained in more detail later and which may be embodied in sunglasses or other forms of optical systems, are actually based upon a more fundamental discovery in the optical field.

It has been found that a light transmitting plate, such as a glass plate, for example, which has a scratched or sculptured surface may be reconstituted to a surface where light is transmitted therethrough as a coherent beam, making objects seen through the glass appear clear instead of distorted. The reconstitution does not involve physical remedial alteration of the light scattering distortions on the original plate surface. The modification involves only the filling in of the scratches, contours and perturbations (the interstices) of the light distorting surface with a hardenable plastic material having the same or a very similar index of refraction to that of the material being corrected and, once filled in, to establish on the plastic material a smooth outer surface so that light being transmitted through that surface will not be scattered with resultant image distortion.

The plastic filler material can be a state of the art clear liquid optical adhesive with a low enough viscosity to completely fill in and occupy the interstices of the irregular light distorting surface. While the viscosity of such a material may be conducive to a self-leveling flow before curing, this alone cannot produce the smooth surface required for the transmission of undistorted light. Accordingly, it is beneficial to actually produce the smooth surface of the viscous fluid filler by placing next to it in adhesive relationship a clear piece of transparent material, such as glass, which has at least one smooth surface which will become the outer surface of the laminate created by the first glass plate, the adhesive and the second plate of glass.

Having then discovered that the so called scratched or sculptured glass plate can be made to transmit an undistorted image by the foregoing process of filling in and then backing the inner filler layer with another clear plate, it has also been discovered that the sculptured surface of the first plate can again be made to be seen, or recreated, by adding to that surface a reflective material. If the reflective material is very thin, such as in the order of microns, it can be made semi-transparent. That is, light will pass through the reflective material in a substantially coherent manner even though it may have a different index of refraction than the plates of glass or adhesive. Depending upon the thickness of the reflective material and its other characteristics, it will reflect some of the light passing through the sandwich, which reflections will portray the image of whatever sculpturing or surface distortion is present in the first plate.

The present invention therefore involves not only the discovery of how to reconstitute or restore a light scattering or translucent surface into a coherent light transmitting system, it involves practical applications where such a structure is combined with the reverse of that teaching to produce desired reflections which are a function of purposeful distortion or sculpturing of one of the light transmitting plates of the assembly.

Almost by definition, when deliberate distortion of the surface is done, a three-dimensional surface topography is the result. Accordingly, a variety of three-dimensional portrayals, including bas relief, can be the subject of the reflective image to be seen by an outside observer in the sunglasses lenses of the present invention. The image of the faces of a silver dollar coin is an example. Using a coin as exemplary of other similar impression-creating devices or objects, the invention can be summarized as including a first lens portion or plate having the traditionally polished outside surface but whose inside surface is molded in the image of one face of the coin. On this irregular bas relief surface is deposited a micro-thin reflective film, such as gold or the sculptured plate itself may be tinted to provide a reflective medium. A second lens plate is laminated to the micro-thin reflective layer or to the plate having the embedded tinting, creating, in the first case, a sandwich structure wherein the surface topography of the middle micro-thin reflective layer corresponds to, and is a counterpart of, the three-dimensional bas relief surface of the object to be portrayed, as the coin's face in this example. The outside surfaces of the first and second lens portions are smooth and are parallel to one another, unless the lens is intended to be a power lens in which case one such surface is made convex or concave to meet an optometric prescription, including bifocals. It should be noted that opposing non-parallel outside lens surfaces do not affect the bas relief reflection, except for the magnification or diminution produced by the lens. The reflection is only a function of the inner reflective surface or tinting medium of the laminated structure.

The laminated lens structure acts as a beam splitter, accommodating transmission through the lens of coherent undistorted light from objects to be seen through the lens and reflecting scattered light from the bas relief image of the object whose surface impression was fixed on the inside surface of one of the lens plates and made reflective by a reflective medium. The color of the reflected image will depend on the material used as the intermediate laminate or reflective layer between the anterior and posterior plates or the color of the reflected image may be controlled by the color tinting of one of the plates itself.

DESCRIPTION OF THE DRAWINGS

FIG. 1 is a perspective view of the lenses of the present invention as applied to sunglasses.

FIG. 2 is a front elevational view of a single lens of the present invention showing the reflected bas relief image as it would appear to an observer.

FIG. 3 is an exploded view of the lens of the present invention showing the sculptured inside surface of the anterior lens plate and the posterior lens plate.

FIG. 4 is an enlarged fragmentary cross-sectional view similar to that of FIG. 5, except that the elements of the construction are enlarged out of proportion to adequately illustrate three different methods of producing the lens.

FIG. 4A illustrates a construction where the anterior plate of the system has been injection molded with the bas relief sculpturing molded into the said plate and where the posterior plate is case directly against the reflective coating which was applied to the inner sculptured surface of the anterior plate. The reflective coating is shown by the dark line between the lens plates.

FIG. 4B illustrates a construction where the posterior lens is not sculptured to fit against the inner surface of the anterior lens plate, but is smooth on both sides and is adhered to that anterior lens plate by a clear adhesive, which adhesive has a light refraction index similar to that of the lens plate. This figure illustrates the basic discovery of the invention, where the distorted inner surface of one plate, the anterior plate in the drawing, is made to transmit coherent light images by the use of the clear adhesive and a second, or posterior plate, having at least an outside smooth surface. This figure also diagrammatically illustrates with the darkened interior line the use of the semi-transparent reflective material; however, if no reflection were to be desired, the reflective material would be omitted from the construction.

FIG. 4C illustrates a method of construction whereby the posterior lens plate is contoured to be a mating counterpart of the anterior plate and is attached thereto by a means of clear adhesive with a similar index of refraction. The micro-thin layer of reflective material is shown coated to the inner surface of the anterior plate and illustrated by a heavy dark line.

FIG. 5 is a fragmentary cross-sectional view taken along lines 5—5 of FIG. 2, showing diagrammatically the light beams which enter the lens and which are transmitted to the eye of a wearer of the sunglasses, and showing that portion of the light beam which is reflected by the inner reflective film which is coated on the inner surface of the anterior lens plate.

FIG. 6 is a view similar to FIG. 5, except that the light beams which are depicted as entering the lens are shown as being reflected by the outside surface of the posterior lens plate and then re-reflected by the reflective interior micro-thin coating in order to scatter the reflected light and avoid double images to the eye of the wearer.

DETAILED DESCRIPTION

An example of sunglasses 2 having the novel lenses 4 of the present invention is seen in FIG. 1 of the drawings. Each of the lenses 4 comprises a laminated sandwich consisting of a front, or anterior, lens plate 6, a rear, or posterior lens plate 8, the latter of which takes its position on the inside of the total lens structure next to the eye of the wearer, and a micro-thin layer 10 disposed between the anterior and posterior lens plates 6 and 8.

The bas relief object which is chosen to be imaged by reflected light is used as a casting surface for forming the topography of the interior face 12 of one of the lens plates, the anterior plate 6, as seen in FIG. 4, is shown as an example. The surface irregularities and undulations which form the contour of the pattern object are transferred directly to the interior face 12 by the process of casting or molding the lens plate 6, which can be of glass or a plastic material.

To the topographically contoured surface of the interior face 12 of the anterior lens plate 6 is added, by well-known deposition methods, the micro-thin layer 10 of a light reflective material, such as gold. In place of a deposited reflective inner layer, one of the lens plates itself can be tinted to provide a similar result.

Several methods would be suitable for formulating the posterior lens plate. One such process is to cast it directly against the interior reflective coated surface 12 of the anterior lens plate 6 as shown in FIG. 4A. It is to be understood that anterior and posterior designations are exemplary only and a reversal of the parts will produce the same result.

A second method involves separate injection molding of the posterior lens plate with its inside or front facing surface molded so as to provide a matching surface fit with the inside or rear facing surface 12 of the anterior lens plate 6 as shown in FIG. 4C. By a matching surface fit, it is meant that the peaks and valleys of one surface are counterparts of the peaks and valleys of the mating surface of the other plate. The contoured posterior plate 8 is then laminated to the anterior plate with a clear adhesive 11.

The methods illustrated in FIGS. 4A and 4C are essentially similar in result and differ only in the actual method of manufacture and fabrication.

A third method of construction yields yet another variation in the product. The posterior lens plate can be smooth on both of its opposing surfaces and laminated to the irregular coated inside surface 12 of the anterior plate 6 with an adhesive 11 which will fill the irregularities of the inside surface 12 of the anterior plate 6 and form an interface between the anterior and posterior plates as shown in FIG. 4B, resembling, except for the presence of the reflective medium, the structure of the basic parental discovery of the present invention.

Obviously, the construction of the FIG. 4B embodiment is the simplest and least expensive because the second plate does not receive the same sculpturing as the first plate received. The FIG. 4B method, however, would not be practical when the light refractive index of the adhesive layer 11 cannot be matched to the refractive index of the anterior and posterior plates 6 and 8. With a mismatch of indices, it then becomes important to reduce the thickness of the adhesive layer to the absolute minimum in order to reduce the distortion produced by the mismatch of the indices of refraction. The more equal the index of refraction of the plastic adhesive layer 11 is to the index of refraction of the plates 6 and 8, the thicker the layer may be. On the contrary, if the indices are not equal then the thickness of the layer 11 must be thinner, creating at the extreme the necessity for the second plate 8 to have the same topography, but in reverse or negative, to that of the inner surface 12 of the anterior plate 6, that is, an inverse relationship exists between the match of the indices and the thickness of the plastic layer 11. The greater the mismatch, the thinner the layer. The embodiments shown in FIGS. 4A and 4C will accommodate a very reduced thickness of adhesive layer. It should be noted that the adhesive layer of FIG. 4C is diagrammatic only and is not intended to be shown as proportionate in its thickness to the adhesive layer of the FIG. 4B construction.

Regardless of the method of joining the two plates of the lens 4, a light beam 17 which enters the lens 4 will be split at the point of incidence with the reflective film 10, a portion of the light passing as coherent light through the film 10 to the eye 13 of the wearer, and a portion 23 of the total light energy being reflected by the irregular surface of the imaging topography formed by the coating 10 on the inside surface of one of the lens plates. The reflected portion of the light 23 will produce the bas relief image of the casted object in the eye of an observer looking at the lens from the front side.

Even though it is pointed out that one plate of the lens system does not necessarily need to be the sculptured counterpart of the first in order to obtain the light beam splitting phenomenon of the inventive structure, it is necessary that there be a second plate as the outside layer of the sandwich construction. The outside plate, even though smooth on both sides, functions to refocus the light waves to produce the coherent image of the transmitted light.

The wearer of the glasses does not see an image of the pattern fixed in the lens because the light entering the lens from the rear, or from the wearer's side, is minimal compared to the coherent light being transmitted through the lens which comes from sources in front of it. On the other hand, on the observer's side of the lens, there is significant light entering the lens and even a portion of that total light, which is the reflected light, is sufficient to produce a clear image of the three dimensional object embedded in the lens structure.

In speaking of three-dimensional objects or patterns fixed to the inside of the lens, it is to be understood that the bas relief produced by the face of a coin is only one example. Etching of the inside surface of one of the plates by scratching or similar methods would also produce a three-dimensional image, corresponding to the depth of the abrasion.

In addition to reflecting the bas relief image, the interior layer 10 serves another useful purpose by eliminating the need for anti-reflective coatings, such as magnesium fluoride, to be placed on the outside surfaces of the lenses. As seen clearly in FIG. 6, a portion 19 of the light energy 17 entering the lens and passing through the film 10 will be reflected back into the lens by its rear facing exterior surface 25. Normally, this reflected light 19 will then be re-reflected from the forward facing exterior surface 26 of the lens, producing distracting images or hot spots to the wearer. In the construction of the present invention, however, the irregular surface of the reflecting film 10 acts to scatter and re-reflect the light 19, producing no image to the wearer and eliminating the need for an anti-reflective coating on the exterior surfaces 25 and 26 of the lens.

I claim:

1. The method of restoring the coherent light transmitting property of a first plate-like transparent medium which has a specific index of refraction and whose surface irregularities produce light scattering image distortion, comprising;

applying a clear hardenable plastic to the said irregular surface, where such plastic has an index of refraction substantially similar to the index of refraction of the transparent medium; and applying one surface of a second separate part of the transparent medium directly to the plastic in adhering relationship thereto, where one of the opposing surfaces of the transparent medium is smooth and becomes the outside surface of a laminate formed by the first transparent medium, the plastic and the second part of the transparent medium.

2. The method of claim 1 wherein the plastic is of sufficiently low viscosity that the plastic will completely occupy the interstices of the surface irregularities.

3. The method of claim 2 where the plastic contacting surface of the second part of the transparent medium is also irregular.

4. The method of claim 2 where the plastic contacting surface of the second part of the transparent medium is smooth.

5. The method of claim 2 where the thickness of the plastic is inversely proportional to the mismatch of the index of refraction of the plastic to that of the transparent medium.

6. An optical structure comprising in combination;
   a first light transmitting plate member having a smooth exterior surface and an opposing inner surface sculptured with forms and figures topographically contouring that inner surface;
   a second light transmitting plate member secured to the inner surface of the first plate member forming a laminate; and
   a light reflective medium carried by one of the plate members.

7. The combination of claim 6 where the plates are secured together by a clear adhesive having an index of refraction similar to that of the plates.

8. The combination of claim 6 wherein the second light transmitting plate member comprises a smooth outer surface and an inner surface whose topography is the counterpart of the coated inner surface of the first plate.

9. The combination of claim 7 wherein the second light transmitting plate member comprises a smooth outer surface and an inner surface whose topography is the counterpart of the inner surface of the first plate.

10. The combination of claim 6 where the light reflective medium is a semi-transparent layer of metal deposited on one of the plates.

11. The combination of claim 6 where the light reflective medium is color tinting embedded in one of the plates.

12. The combination of claim 6 wherein the second light transmitting plate member has opposing surfaces which are both smooth.

* * * * *